G. B. EVANS.
BRUSH HOLDER.
APPLICATION FILED SEPT. 18, 1918.
1,354,899.
Patented Oct. 5, 1920.
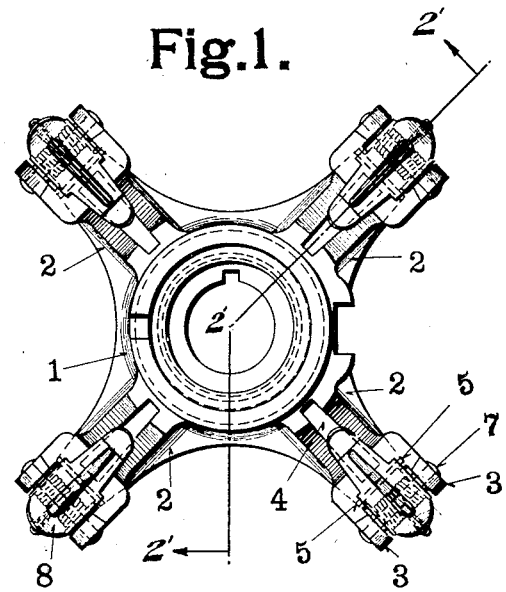
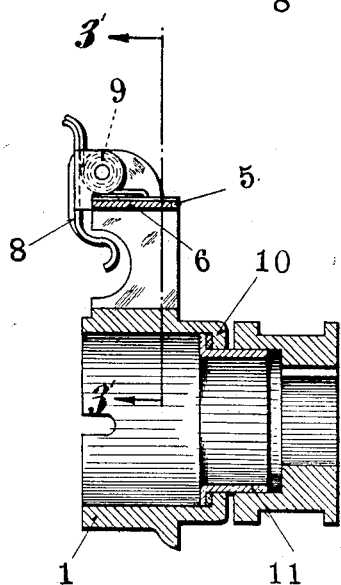
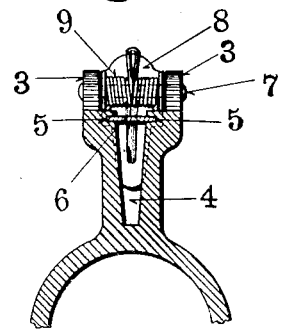
Inventor:
George B. Evans
by E. E. Huffman
atty.

UNITED STATES PATENT OFFICE.

GEORGE B. EVANS, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

BRUSH-HOLDER.

1,354,899.　　　　　Specification of Letters Patent.　　Patented Oct. 5, 1920.

Application filed September 18, 1918. Serial No. 254,570.

*To whom it may concern:*

Be it known that I, GEORGE B. EVANS, a citizen of the United States of America, residing at the city of St. Louis, State of Missouri, United States of America, have invented a certain new and useful Brush-Holder, of which the following is such a full, clear, and exact description as will enable any one skilled in the art to which it appertains to make and use the same, reference being had to the accompanying drawings, forming part of this specification.

My invention relates to a brush holder for dynamo electric machines, particularly those provided with commutators having the contact surface at right angles to the axis of the machine, and its object is to provide a rigid durable holder of few parts so arranged as to be easily and securely formed and assembled and one which is convenient in operation.

In the accompanying drawings, Figure 1 is a top plan view of a holder embodying my invention. Fig. 2 is a section on the line 2'—2' of Fig. 1, and Fig. 3 is a section along the line 3'—3' of Fig. 2.

The holder comprises a casting 1 forming a hub and integral radially extending arms 2. Each of these arms is also provided with a pair of integral extensions 3. Slots 4 are cut through each arm from the end thereof between the extensions 3 and inwardly toward the hub. Oppositely located grooves 5 are formed in the walls of these slots and plates 6 are inserted in these grooves closing the open sides of the slots and forming therewith guides for the brushes. The plates are held in position by staking and by the rivets 7 which connect the extensions 3 and thus draw and hold the bifurcated ends of the arms in firm contact with the plates 6. Brush followers 8 are mounted on the rivets 7 and extend inward over the brush guides. The followers are actuated by the coil springs 9 which surround the rivets.

The hub is provided with an opening through which the armature shaft of the machine extends and with an inwardly extending flange 10 coöperating with a corresponding flange on the mounting 11. The holder may thus have rotating movement with respect to the mounting but is held in position thereon.

It will be apparent from the foregoing description that my brush holder can be easily and accurately made and is substantially a one piece article without connecting devices which can become loosened in operation.

Having fully described my invention, what I claim as new and desire to secure by Letters Patent of the United States is:

1. A brush holder comprising a hub provided with radially extending arms, said arms being provided with slots extending therethrough and from the ends inward toward the hub, plates closing the open sides of the slots to form brush guides, and means clamping said plates between the walls of the slots.

2. A brush holder comprising a hub provided with integral radially extending arms, each of said arms having a slot extending therethrough and provided with a pair of integral extensions on opposite sides of the slot, means closing the open sides of the slots to form brush guides, and rivets connecting the extensions of each arm to clamp the closing means in position between the walls of the slots.

3. A brush holder comprising a hub provided with integral radially extending arms, each of said arms having a slot extending therethrough and provided with a pair of integral extensions on opposite sides of the slot, means closing the open sides of the slots to form brush guides, rivets connecting the extensions of each arm, and brush followers mounted on said rivets and projecting inwardly over the brush guides.

4. A brush holder comprising a hub provided with integral radially extending arms, said arms having slots extending therethrough and from the ends inward toward the hub and oppositely positioned grooves in the walls of said slots, plates positioned in said grooves and closing the open sides of the slots to form brush guides, and means permanently clamping said plates in the grooves.

In testimony whereof, I have hereunto set my hand and affixed my seal.

GEORGE B. EVANS. [L. s.]